(No Model.)
W. KING.
FISHING REEL.
No. 467,482. Patented Jan. 19, 1892.
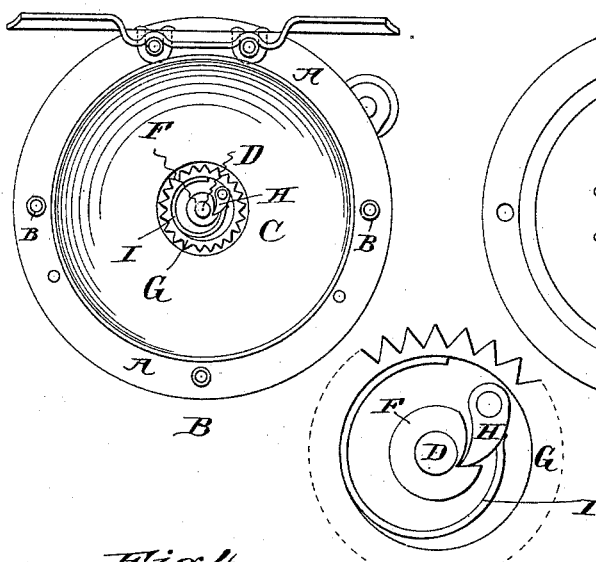
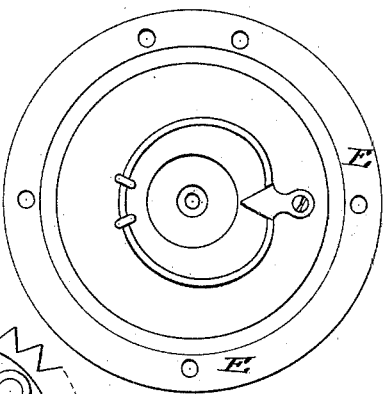
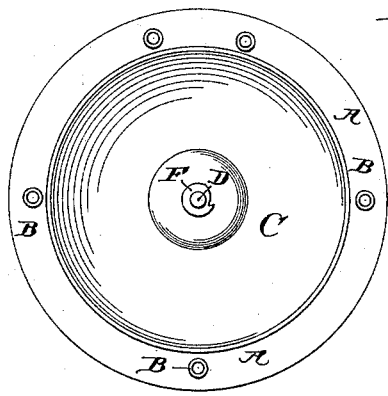
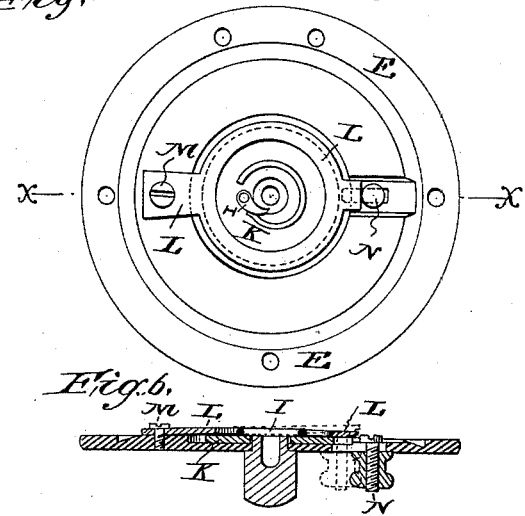
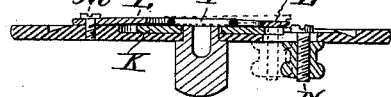
Attest:
W. M. Benjamin
A. C. Aubery
William King, Inventor,
by Henry P. Wells, his Atty

UNITED STATES PATENT OFFICE.

WILLIAM KING, OF BROOKLYN, ASSIGNOR TO CHARLES F. IMBRIE, OF NEW YORK, N. Y.

FISHING-REEL.

SPECIFICATION forming part of Letters Patent No. 467,482, dated January 19, 1892.

Application filed August 25, 1891. Serial No. 403,685. (No model.)

*To all whom it may concern:*

Be it known that I, WILLIAM KING, a citizen of the United States, and a resident of the city of Brooklyn, in the county of Kings and State of New York, have invented a new and useful Improvement in Fishing-Reels, of which the following is a specification.

Heretofore fishing-reels provided with a drag or click have been so made that the drag or click when in operation is operative both when the line is reeled in or drawn out. This is objectionable, since the drag or click is of practical utility only when the line is drawn out. The office of the drag or click is that of a brake. Consequently if it acts when the line is reeled in it not only imposes useless labor on the user, but it also doubles the wear of the mechanism to no useful end.

The object of my invention is to overcome the above-noted objections, and I therefore construct my reel so that the click or drag will operate only when the line is drawn from the reel.

The nature of the invention therefore consists of constructions, combinations, and arrangement of parts, as will hereinafter be described in the specification, and pointed out in the claims, reference being had to the accompanying drawings, wherein—

Figure 1 is an elevation showing the click end of the spool of my reel with its contiguous side plate removed. Fig. 2 shows a like view of the inner surface of said side plate—that is, the side plate contiguous to the click end of the spool. Fig. 3 shows my click-wheel and its mechanism. Fig. 4 is a view similar to that shown in Fig. 1 when a drag is substituted in place of a click. Fig. 5 is a view of the inner surface of the side plate contiguous to the drag end of the spool, with my drag in position. Fig. 6 is a sectional view on the line $x\ x$ of Fig. 5.

In the drawings, A is the side plate of the reel on the handle side. B B are the posts or pillars which separate the side plates to form the frame in which the spool revolves. C is the end of the spool, showing its inner surface—*i. e.*, the surface concealed by its contiguous side plate when the reel is in operative condition. The spool C revolves on the pivot D, which has its bearing in the side plate E. The pivot D is provided with a hub F, cut away on one side to form a tooth, as best shown in Fig. 3.

G is a toothed wheel provided with an annular central opening, so that it may be placed on and be centered by the hub F.

H is a pawl, and I is its spring, both fastened to and operating in a shallow recess made in the toothed wheel G, all as is clearly shown in Fig. 3. It is clear that when the spool, with its axle D and its hub F, are turned in one direction the pawl H will engage with the tooth in the hub F and force the toothed wheel to revolve with it. The toothed wheel G will then engage with and operate the ordinary pawl and spring shown in Fig. 2, just as in the ordinary form of click-reel in common use. It is also obvious that when the spool, its axle, and hub are turned in the opposite direction the pawl H will not engage with the tooth in the hub F. The resistance of the ordinary pawl and spring shown in Fig. 2 (which engages with the toothed wheel G when the reel is in operative condition, as in the ordinary form of click-wheel in common use) is sufficient to prevent the toothed wheel G from turning. It remains stationary, and the hub F revolves within it, and the click is inoperative. When instead of a click a drag is used as a brake, the arrangement is almost precisely the same. A thin plate of metal K, corresponding in all things with the toothed wheel G, except that it is thinner and not toothed, and like it is provided with a pawl H and spring L, as shown by the dotted lines in Fig. 5, is substituted for the toothed wheel G. The brake-action is obtained by the friction of the plate K against the side plate of the reel. It is clear that like the toothed wheel G, and for the same reason, the drag-plate K will turn and produce friction when the spool and its axle are turned in one direction, while it will remain stationary and inoperative when the spool and its axle are turned in the opposite direction. A leather washer, interposed between the drag-plate K and its side plate E, will improve its action.

L is an annular spring secured to the side plate E at M and bearing on the brake-plate K in such a manner as to press it against the side plate E to produce the necessary friction. As drawn, by moving the stud N inward the spring L may be raised so that it no longer bears on the brake-plate K. The drag is thus thrown out of operation altogether; but I do not claim this as part of my invention.

Having thus described my invention and its mode of operation, what I claim as new, and desire to patent, is—

1. In a fishing-reel provided with a click or drag, a toothed wheel or drag-plate provided with a pawl and spring, in combination with a toothed hub upon the axle of the said reel, the whole so arranged that when the axle is revolved in one direction the toothed wheel or drag-plate is carried with it, while when said hub is revolved in the opposite direction said wheel or plate will remain at rest.

2. In a fishing-reel, a circular drag-plate concentric with the pivot of the reel, in combination with a spring fastened at one end to the side plate E, the whole so arranged that said spring shall bear upon and force said drag-plate into close contact with said side plate.

In testimony that I claim the foregoing as my invention I have signed my name, in presence of two witnesses, this 24th day of August, 1891.

WILLIAM KING.

Witnesses:
HENRY P. WELLS,
G. C. HEMENWAY.